United States Patent [19]
Stoephasius et al.

[11] Patent Number: 5,394,610
[45] Date of Patent: Mar. 7, 1995

[54] CATALYTIC CONVERTER AND METHOD FOR PRODUCING THE SAME

[75] Inventors: Rainer Stoephasius, Altenkunstadt; Wieland Mathes, Michelau; Ronald Neufert, Lichtenfels; Helmut Schmelz, Prien; Jürgen Zürbig, Burgkunstadt, all of Germany

[73] Assignee: Siemens Aktiengesellschaft, Munich, Germany

[21] Appl. No.: 75,138

[22] Filed: Jun. 10, 1993

[30] Foreign Application Priority Data

Jun. 10, 1992 [EP] European Pat. Off. ............ 92109759

[51] Int. Cl.⁶ .............................................. B21D 53/00
[52] U.S. Cl. ...................... 29/890; 422/180; 148/287
[58] Field of Search ............... 422/180, 171; 29/890, 29/527.1, 527.2; 75/235; 427/126.3, 216, 213–214; 502/303; 148/287, 276, 277

[56] References Cited

U.S. PATENT DOCUMENTS

| | | | |
|---|---|---|---|
| 2,501,128 | 3/1950 | Kerr | 148/287 |
| 3,089,783 | 5/1963 | Carlson et al. | 427/421 |
| 3,446,652 | 5/1969 | Smith | 427/374 |
| 4,193,793 | 3/1980 | Cheung | 75/235 |
| 4,268,542 | 5/1981 | Sakakibara et al. | 427/195 |
| 4,285,838 | 8/1981 | Ishida et al. | 252/469 |
| 4,320,074 | 3/1982 | Birchall et al. | 264/63 |
| 4,370,262 | 1/1983 | Takahashi et al. | 252/464 |
| 4,379,109 | 4/1983 | Simpson | 264/60 |
| 4,455,281 | 6/1984 | Ishida et al. | 422/171 |
| 5,051,392 | 9/1991 | Malilon et al. | 502/303 |

FOREIGN PATENT DOCUMENTS

| | | |
|---|---|---|
| 0246413 | 11/1987 | European Pat. Off. |
| 0387394 | 9/1990 | European Pat. Off. |
| 2450664 | 4/1975 | Germany |
| 2844294 | 4/1979 | Germany |
| 1492929 | 11/1977 | United Kingdom |

*Primary Examiner*—Robert J. Warden
*Assistant Examiner*—Hien Tran
*Attorney, Agent, or Firm*—Herbert L. Lerner; Laurence A. Greenberg

[57] ABSTRACT

A catalytic converter includes a metal carrier body, an adhesion-promoting intermediate layer in the form of an oxide film applied to the carrier body and a catalytically active layer applied to the intermediate layer. A method for producing a catalytic converter includes heating a metal carrier body in an oxidizing atmosphere to form an adhesion-promoting intermediate layer in the form of an oxide film on the carrier body and applying a catalytically active layer to the intermediate layer.

19 Claims, 2 Drawing Sheets

CATALYTIC CONVERTER AND METHOD FOR PRODUCING THE SAME

BACKGROUND OF THE INVENTION

Field of the Invention

The invention relates to a catalytic converter and a method for producing the same.

Typical catalytic converters of the kind which are used, for instance, to reduce the nitrogen oxides in flue gas, usually include a metal carrier body, an adhesion-promoting intermediate layer, and a catalytically active layer applied to the intermediate layer. In the manufacture of catalytic converters, a fundamental problem which arises is that of establishing good adhesion of the catalytically active layer to the metal carrier body.

Particularly for producing plate-type catalytic converters, methods for solving that problem are known in which an adhesion-promoting intermediate layer is produced on an expanded metal carrier body (U.S. Pat. Nos. 4,370,262; 4,285,838 and 4,455,281) by spraying on liquid aluminum (aluminum flame spraying). However, producing a catalytic converter with that method requires that a very large amount of energy be expended to liquefy the aluminum. Moreover, liquid aluminum, which drops through voids in the carrier body during the spraying process, is no longer directly reusable, because some of it is oxidized. Both of those situations make such a method relatively expensive.

Published European Application No. 0 387 394 A1 also discloses a method in which the carrier body of the catalytic converter is produced by sintering from multiple-ply fabrics and/or from knitted goods and/or from fibrous material. A disadvantage of that method is that fabrics and knitted goods are complicated and expensive to produce, while conversely fibrous materials can be produced only in a relatively poorly defined form.

It is accordingly an object of the invention to provide a catalytic converter and a method for producing the same, which overcome the hereinafore-mentioned disadvantages of the heretofore-known devices and methods of this general type, with which a catalytic converter, in particular a plate-type catalytic converter, can be produced economically and in which good adhesion of the catalytically active layer to the metal carrier body is achieved at the same time.

SUMMARY OF THE INVENTION

With the foregoing and other objects in view there is provided, in accordance with the invention, a catalytic converter, comprising a metal carrier body; an adhesion-promoting intermediate layer in the form of an oxide film applied to the carrier body; and a catalytically active layer applied to the intermediate layer.

On one hand, oxide films can adhere adequately firmly to the substrate material, and on the other hand they produce adequate surface roughness for the adhesion of the catalytically active material.

With the objects of the invention in view, there is also provided a method for producing a catalytic converter, in particular a plate-type catalytic converter, which comprises heating a metal carrier body in an oxidizing atmosphere to form an adhesion-promoting intermediate layer in the form of an oxide film on the carrier body; and applying a catalytically active layer to the intermediate layer.

As a result, the surface of the carrier body is oxidized and is given a roughness and a porosity that promote the adhesion of the catalytically active layer to the carrier body.

In accordance with another mode of the invention, the catalytic material can be applied in the form of a paste-like composition, onto an adhesion-promoting intermediate layer that is produced in this way, by being rolled onto the intermediate layer and then calcined.

In accordance with a further feature of the invention, the intermediate layer contains a chlorine compound of the carrier body. As a result, chlorine and chlorine-oxygen compounds of the carrier body also contribute to improving the adhesion promotion.

In accordance with an added mode of the invention, the intermediate layer contains particles sintered onto the carrier body. Depending on the particle size, the particles can contribute to a considerable extent to the macroscopic or microscopic roughening of the carrier body surface.

In accordance with an additional mode of the invention, an oil film is applied to the carrier body before the heating is finished. This is done in order to accelerate and homogenize the oxidation process at the surface of the metal carrier body, and as a precondition for a further feature of the invention. Preferably, the cutting oil applied to the expanded metal for the expanding process can be left on the carrier body, for example. In the oxidation process the cutting oil, although itself a reducing agent, leads to an additional spot-wise importation of heat to the carrier body surface and therefore, given an adequate supply of oxidizing agent, it leads to thickening of the oxide film.

In accordance with yet another mode of the invention, a mechanical mixture of particles adhering to the oil film is applied to the carrier body, after the oil film is applied and before the heating. As a result, a partially oxidized and relatively greatly roughened layer forms on the carrier body. Its properties of adhesion with respect to the catalytic material can be adapted to this material by means of a suitable selection of the particles. The term mechanical mixture of particles is understood to mean particles of metal and/or glass and/or ceramic, in particular particles of silver-tin-oxide $AgSnO_2$ and a material $X_5CrNi_{18,9}$ (material No. 1.4306).

In accordance with yet a further mode of the invention, the mechanical mixture of particles is made into a slurry in oil and applied with it to the carrier body in the form of a suspension before the heating. This kind of procedure has the same advantages already discussed above. These advantages apply equally to a further alternative procedure for applying the particles to the carrier body, in which a mechanical mixture of oil-saturated particles is calendered onto the carrier body in the form of a paste-like composition prior to the sintering.

In accordance with yet an added mode of the invention, an oil with a chlorine content of at least 1% is used, in order to further speed up the oxidation of the carrier body surface. As a result, not only oxygen compounds of the carrier body material but also chlorine compounds of the carrier body material are formed on the surface of the carrier body. They contribute to eroding the surface of the carrier body and therefore to improving the adhesion promotion of the intermediate layer.

In accordance with yet an additional mode of the invention, if no particles have been applied, then the heating is carried out at a temperature of 200° to 600° C. and over a period of time lasting at least 5 hours. This forms a homogeneous oxide film that adheres very well to the carrier body and serves as an adhesion-promoting intermediate layer for the catalytically active material.

In accordance with a concomitant mode of the invention, if a mechanical mixture of particles is applied to the carrier body before the carrier body is heated, then the heating is performed at a temperature of from 700° to 1000° C., over a period of time lasting several minutes. As a result, on one hand the applied particles are sintered onto the carrier body, but on the other hand an oxidized film is also formed on the surface of the carrier body, which also adheres firmly to the non-oxidized material of the carrier body according to this procedure.

Other features which are considered as characteristic for the invention are set forth in the appended claims.

Although the invention is illustrated and described herein as embodied in a catalytic converter and a method for producing the same, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
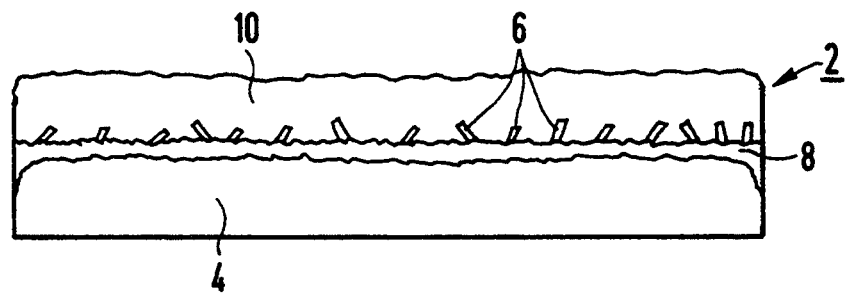
FIG. 1 is a fragmentary, diagrammatic, longitudinal-sectional view of a plate-type catalytic converter according to the invention.

Referring now to the figures of the drawing in detail and first, particularly, to FIG. 1 thereof, it is seen that in order to produce a plate-type catalytic converter 2, a stainless steel mesh, which is also known as an expanded metal made of stainless steel, is used as a carrier body 4 in an exemplary embodiment. In order to carry out the mesh making or expansion process, a cutting oil that has a chlorine content of 2% was applied to the carrier body. It was left on the expanded metal.

In the exemplary embodiment, relatively fine particles 6 of silver-tin-oxide $AgSnO_2$ were atomized onto the carrier body 4 moistened with cutting oil. These particles for the most part adhere adhesively to the cutting oil on the surface of the carrier body 4. Next, the carrier body 4, on which the cutting oil and the particles 6 adhering to it were located, were heated to a temperature of 900° C. over a period of five minutes. In the process, on one hand the particles 6 located on the carrier body 4 were sintered onto the carrier body 4. On the other hand, the chlorine contained in the cutting oil dictates relatively major erosion of a surface film 8 of the carrier body 4, on which compounds of the carrier body 4 that preferentially contain oxygen, chlorine, and chlorine-oxygen were formed as a result. Both situations together result in both macroscopic and microscopic roughening of the surface 8 of the carrier body 4. This creates a very good basis for adhesion for a catalytically active layer 10 applied to it on the carrier body 4, so that the surface film 8 is in the form of an adhesion-promoting intermediate layer. The catalytically active material 10 in the exemplary embodiment was applied to the intermediate layer in the form of a paste-like composition. The catalytic converter blank was then dried and calcined.

Figure 2:
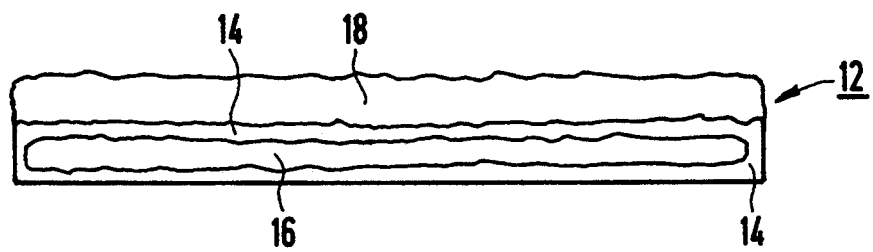
FIG. 2 is a fragmentary, longitudinal-sectional view of a further plate-type catalytic converter according to the invention.

Alternatively, in a further exemplary embodiment seen in FIG. 2, a further plate-type catalytic converter 12 was produced with an adhesion-promoting intermediate layer 14 without particles being sintered on, and was placed onto a metal mesh or expanded metal carrier body 16. In this case the cutting oil, which has a chlorine content of 2% and was applied to the carrier body 16, was left on the carrier body 16. In this case the carrier body 16 was heated to a temperature of 450° C. and kept at this temperature for a period five hours. In the process, besides the formation of oxygen compounds, chlorine and oxygen-chlorine compounds of the carrier body 16 also form, which predominantly change into oxygen compounds of the carrier body 16 because of the relatively long holding time. The surface film 14 of the carrier body 16 that is oxidized in this way offers a very good basis for adhesion for a catalytically active layer 18. This layer 18 was applied in the form of a paste-like composition to the roughened carrier body 16, then dried, and then hardened on the carrier body 16 by calcination.

Figure 3:
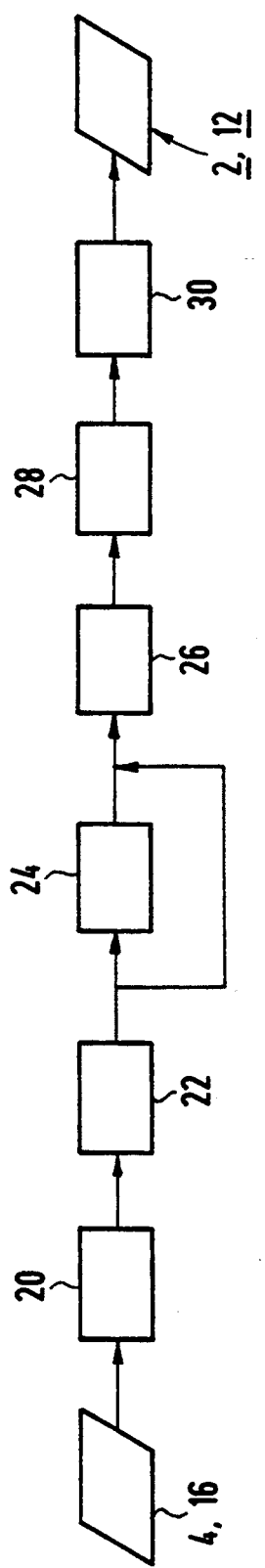
FIG. 3 is a flow diagram showing the sequence of method steps of the production method according to the invention.

FIG. 3 is a flow chart which once again explicitly shows the sequence of method steps for producing a plate-type catalytic converter in accordance with FIGS. 1 and 2.

Beginning with the carrier body 4, 16, which is formed of expanded metal made of stainless steel, the first step is an application 20 of a chlorine-containing cutting oil, followed by an expansion process 22. This can be followed by an application 24 of the particles 6. The carrier body 4, while still moistened by cutting oil, expanded, and provided with particles 6 that adhesively stick to the cutting oil, then arrives at a heating step 26. In the present case, a temperature of approximately 900° C. is employed over a period of approximately 5 minutes. This is followed by an application 28 of the catalytically active layer 10, 18 onto the carrier body 4, which now has a microscopically and macroscopically roughened surface layer 8. Finally, the catalytic converter blank which is then available is also subjected to calcination 30, as a result of which the plate-type catalytic converter 2 of FIG. 1 is obtained as a finished product.

The plate-type catalytic converter 12 of FIG. 2 is obtained if the application 24 of the particles 6 is omitted. The heating 26 is then carried out at a temperature of approximately 450° C. over a period of approximately five hours. The roughened surface layer 8 then has chlorine and/or oxygen and/or chlorine-oxygen compounds of the carrier body 16, as a result of which the roughening is originally brought about. All of the other method steps 20, 22, 28, 30, as described above, may be retained.

We claim:

1. A method for producing a catalytic converter, which comprises:

heating a metal carrier body in an oxidizing atmosphere to form an adhesion-promoting intermediate layer in the form of an oxide film on the metal carrier body;

depositing a catalytically active layer directly on the intermediate layer formed in the heating step; and subsequently calcining the metal carrier body together with the intermediate layer and the catalytically active layer.

2. The method according to claim 1, which comprises depositing an oil film on the metal carrier body prior to the heating step.

3. The method according to claim 2, which comprises depositing a mixture of particles adhering to the oil film deposited on the metal carrier body, after the step of depositing the oil film and before the heating step.

4. The method according to claim 3, which comprises adding chlorine to the oil until a chlorine content of at least 1% is reached.

5. The method according to claim 2, which comprises adding chlorine to the oil until a chlorine content of at least 1% is reached.

6. The method according to claim 2, which comprises carrying out the heating step at a temperature of from 200° to 600° C.

7. The method according to claim 6, which comprises carrying out the heating step over a period of at least five hours.

8. The method according to claim 2, which comprises carrying out the heating step at a temperature of from 700° to 1000° C.

9. The method according to claim 8, which comprises carrying out the heating step over a given period of time.

10. The method according to claim 6, which comprises making a slurry suspension of particles and oil, and depositing the slurry suspension of particles on the metal carrier body, prior to the heating step.

11. The method according to claim 10, which comprises adding chlorine to the oil until a chlorine content of at least 1% is reached.

12. The method according to claim 1, which comprises calendering a mixture of oil-saturated particles onto the metal carrier body, prior to the heating step.

13. The method according to claim 12, which comprises adding chlorine to the oil until a chlorine content of at least 1% is reached.

14. The method according to claim 1, which comprises carrying out the heating step at a temperature of from 200° to 600° C.

15. The method according to claim 14, which comprises carrying out the heating step over a period of at least five hours.

16. The method according to claim 1, which comprises carrying out the heating step at a temperature of from 700° to 1000° C.

17. The method according to claim 16, which comprises carrying out the heating step over a given period of time.

18. The method according to claim 1, which comprises shaping the metal carrier body in the form of a plate prior to the heating step.

19. A method for producing a catalytic converter, which comprises: depositing a mixture of particles on a metal carrier body; heating the metal carrier body in an oxidizing atmosphere at a temperature of from 700° to 1000° C. over a given period of time to form an adhesion-promoting intermediate layer in the form of an oxide film on the metal carrier body with sintered particles on the metal carrier body; depositing a catalytically active layer on the intermediate layer directly; and calcining the metal carrier body together with the intermediate layer and the catalytically active layer.

* * * * *